W. A. PARR.
ANTISKID DEVICE.
APPLICATION FILED MAR. 9, 1914.
1,128,035.
Patented Feb. 9, 1915.
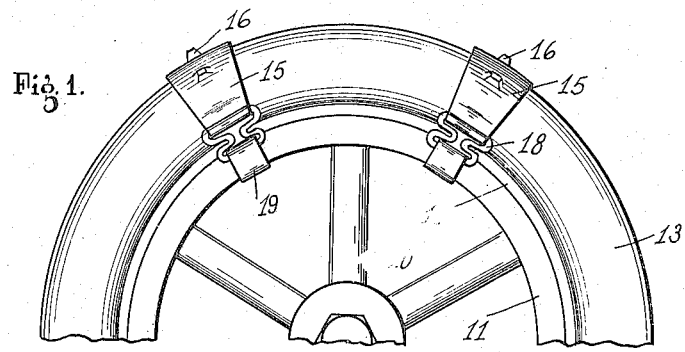
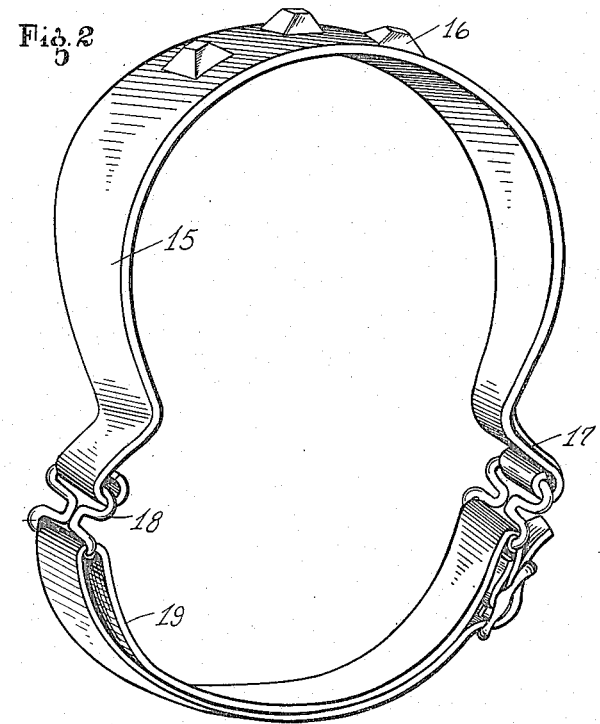
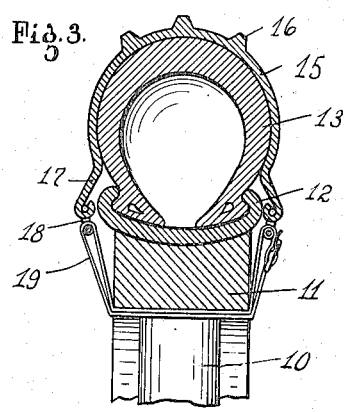
WITNESSES:
INVENTOR
Webster A. Parr.
BY
ATTORNEY

UNITED STATES PATENT OFFICE.

WEBSTER A. PARR, OF FRANKLIN, INDIANA, ASSIGNOR OF ONE-HALF TO WILLIAM FEATHERNGILL, OF FRANKLIN, INDIANA.

ANTISKID DEVICE.

1,128,035.  Specification of Letters Patent.  Patented Feb. 9, 1915.

Application filed March 9, 1914. Serial No. 823,524.

*To all whom it may concern:*

Be it known that I, WEBSTER A. PARR, a citizen of the United States, and a resident of Franklin, county of Johnson, and State of Indiana, have invented a certain new and useful Antiskid Device; and I do hereby declare that the following is a full, clear, and exact description thereof, reference being had to the accompanying drawings, in which like letters refer to like parts.

The object of this invention is to provide means for equipping vehicle wheels to prevent skidding, slipping or spinning of the same, and to make a very strong construction which will resist any pull which the engine may exert.

One feature of the invention consists in providing at intervals around the tire of the wheel, metal anti-skidding means with means passing inside the rim of the wheel for securing it in place, the ends of the metal portion being yielding so that the device will always be held in place under tension and will accommodate itself to variations in the tire, whether from wear or slight deflation. The ends of the metal anti-skidding means are made of a good quality of spring steel and are turned outward so that they will yield and maintain the device always under tension. With this arrangement there is no possibility of the device being thrown off of the wheel by the pull of the engine and the need of set screws or other complex and annoying apparatus for adjusting the tension or taking up the wear of the device is obviated. In other words, it automatically adjusts itself to the varying conditions of the tire and continues at all times under tension.

An additional feature of the invention is that the device may be easily and quickly adjusted with the wheel in any position or when the wheel is partially embedded in mud or gravel without the aid of a jack or any other means necessary to clear the wheel from the ground. It is also so constructed that it will not injure the rim or tire as the ordinary chain anti-skid device and will afford the protection to the same without decreasing the resiliency.

The full nature of the invention will be understood from the accompanying drawings and the following description and claim.

In the drawings, Figure 1 is a side elevation of a portion of a wheel equipped with a number of said anti-skidding devices. Fig. 2 is a perspective view of one of the anti-skidding devices detached. Fig. 3 is a transverse section through the tire, clencher rim, wheel rim and a part of the wheel, showing the anti-skidding device in use.

In detail there is shown herein a wheel having spokes 10, wooden rim 11, clencher rim 12 and pneumatic tire 13. These are all of the usual type of construction.

There is a spring metal anti-skidding device 15 which partially surrounds the tire 13 and on the tread portions there are spurs 16. The inner ends 17 of said anti-skidding metal member 15 are bent outwardly, as shown in Figs. 2 and 3, and links 18 are connected therewith to which a leather strap 19 passes, and said leather strap extends through the wheel over the wooden rim and is buckled at 20. In mounting said anti-skidding means, the leather strap is pulled as tightly as possible so as to put the spring ends 17 under tension. Any number of these anti-skidding devices may be placed on the wheel, as thought best. With this arrangement the construction and expense and annoyance of set screw devices for tightening and holding the anti-skidding metal strip on the tire are obviated. The chief reason for this lies in the spring 17 which automatically maintains the tread under tension and accommodates it to variations in the wear and inflated condition of the tire. With this arrangement, the anti-skidding metal strip will always be held tightly in engagement with the tire. The laterally extending spring ends 17 hold the parts away from the lateral edges of the clencher rim, as seen in Fig. 2. The result is that a very practical and acceptable anti-skidding device is provided here which overcomes the objections to similar devices heretofore.

The invention claimed is:

The combination with a vehicle wheel having a tire rim, of an anti-skidding spring metal strip with its inner ends extending laterally outward, and means connected with said spring ends which passes through the wheel over the rim for tightening and holding the metal strip in place under spring tension.

In witness whereof, I have hereunto affixed my signature in the presence of the witnesses herein named.

WEBSTER A. PARR.

Witnesses:
J. H. WELLS,
O. M. McLAUGHLIN.